US009527260B2

(12) United States Patent
Avitsland et al.

(10) Patent No.: US 9,527,260 B2
(45) Date of Patent: Dec. 27, 2016

(54) SACK PAPER WITH VAPOUR BARRIER

(71) Applicant: Dow Global Technologies LLC, Midland, MI (US)

(72) Inventors: Grete Avitsland, Svartigne (SE); Anna-Karin Magnusson, Linkoping (SE); Lisa-Lotte Jaktlund Enstrom, Kalix (SE)

(73) Assignee: Dow Global Technologies LLC, Midland, MI (US)

(*) Notice: Subject to any disclaimer, the term of this patent is extended or adjusted under 35 U.S.C. 154(b) by 583 days.

(21) Appl. No.: 14/043,909

(22) Filed: Oct. 2, 2013

(65) Prior Publication Data

US 2014/0031187 A1 Jan. 30, 2014

Related U.S. Application Data

(62) Division of application No. 13/382,132, filed on Jan. 26, 2012, now Pat. No. 8,603,597.

(51) Int. Cl.

| | |
|---|---|
| ***B29D 22/00*** | (2006.01) |
| ***B32B 27/10*** | (2006.01) |
| ***B32B 5/26*** | (2006.01) |
| ***B31B 39/00*** | (2006.01) |
| ***B31B 1/00*** | (2006.01) |

(52) U.S. Cl.

CPC ................ *B31B 39/00* (2013.01); *B31B 1/00* (2013.01); *B31B 2221/05* (2013.01); *B31B 2221/50* (2013.01)

(58) Field of Classification Search

CPC ............... B31B 1/00; B31B 39/00; B32B 1/02

USPC .......................................................... 493/308

See application file for complete search history.

(56) References Cited

U.S. PATENT DOCUMENTS

| | | | | |
|---|---|---|---|---|
| 3,414,459 A * | 12/1968 | Wells | B31F 1/07 156/209 |
| 3,533,899 A | 10/1970 | Kapral | |
| 3,560,227 A | 2/1971 | Eichhorn et al. | |
| 3,652,725 A | 3/1972 | Diaz et al. | |
| 3,671,372 A | 6/1972 | Hoffman | |
| 3,784,085 A | 1/1974 | Kilgore | |
| 3,934,587 A | 1/1976 | Gordon | |

(Continued)

FOREIGN PATENT DOCUMENTS

| | | |
|---|---|---|
| EP | 0545228 | 6/1993 |
| GB | 1136622 | 12/1968 |

(Continued)

OTHER PUBLICATIONS

PCT/EP2010/059466 International Search Report.

(Continued)

*Primary Examiner* — Andrew M Tecco
*Assistant Examiner* — Praachi M Pathak

(57) ABSTRACT

The present invention provides a method of forming a coating on a porous sheet, comprising the steps of: providing a porous sheet and a dispersion comprising at least one polyolefin; applying said dispersion on at least one surface of said sheet; and optionally, heating said sheet to a temperature above the melting temperature of said at least one polyolefin. Moreover, the present invention relates to methods for manufacturing single and two ply sacks and the use of at least one polyolefin as a water vapor barrier coating on a material suitable for a ply of a sack.

3 Claims, 4 Drawing Sheets

(56) References Cited

U.S. PATENT DOCUMENTS

| | | | | | |
|---|---|---|---|---|---|
| 5,994,045 | A * | 11/1999 | Bourdelais | G03C 1/79 | |
| | | | | 430/525 | |
| 7,803,865 | B2 | 9/2010 | Moncla et al. | | |
| 8,193,275 | B2 | 6/2012 | Moncla et al. | | |
| 2002/0016402 | A1 | 2/2002 | Kuno et al. | | |
| 2003/0170408 | A1* | 9/2003 | Egan | B32B 29/00 | |
| | | | | 428/34.2 | |
| 2003/0211348 | A1 | 11/2003 | Mueller et al. | | |
| 2010/0230062 | A1* | 9/2010 | Attal | C09D 123/02 | |
| | | | | 162/168.1 | |
| 2012/0134605 | A1* | 5/2012 | Avitsland | D21H 21/22 | |
| | | | | 383/113 | |

FOREIGN PATENT DOCUMENTS

| | | | |
|---|---|---|---|
| GB | 2332873 | 7/1999 | |
| WO | 03010055 | 2/2003 | |
| WO | WO2009/064942 | 5/2009 | |
| WO | WO 2009064942 A1 * | 5/2009 | C09D 123/02 |

OTHER PUBLICATIONS

PCT/EP2020/059466 Written Opinion.

PCT/EP2010/059466 International Preliminary Report on Patentability.

English Abstract of EP0441233 published Aug. 14, 1991, Applicant—PKL Verpackungssysteme GMBH, DE.

* cited by examiner

SACK PAPER WITH VAPOUR BARRIER

REFERENCE TO RELATED APPLICATIONS

This application is a Division of U.S. application Ser. No. 13/382,132, filed on Jul. 2, 2010, which claims priority from Sweden Application No. 0900923.4, filed Jul. 3, 2009; each application is incorporated herein, in its entirety, by reference.

TECHNICAL FIELD OF THE INVENTION

The present invention relates to a material suitable for a ply of a sack and sacks comprising such a material.

BACKGROUND ART

Conventional paper sack constructions suitable for holding and storing of powdery material, such as cement or other building materials, chemicals, food, animal feed and pet food usually has a sack wall that consists of two or three paper plies in order increase the weight which can be held by the sack. Further, since a material such as cement is sensitive to deterioration caused by e.g. moisture penetration during storage, conventional paper sacks are also provided with a moisture barrier film, e.g. of polyethylene (PE), between the plies. The intermediate film functions as a moisture or water barrier and decreases atmospheric vapour penetration through the sack plies into the sack interior.

However, during filling of the sack, the deaeration rate, i.e. the speed at which air inside the sack is transported out from the sack, is often the factor that limits the rate at which the sack can be filled. Air trapped in the sack may lead to under-weight packs, sack rupture and problems when sacks are stacked for transportation. The use of a moisture or water barrier film as an intermediate layers tends to severely reduce the deaeration rate of a sack during filling, since most intermediate moisture barrier films used are highly impermeable to air. Therefore, the moisture barrier film may be provided with slits or perforations to facilitate deaeration of the sack. However, a slitted moisture barrier film obviously decreases the moisture barrier properties of the film, which may lead to moisture penetration.

SUMMARY OF THE INVENTION

The inventors have noted that there is a need in the art for an improved sack material that both has good barrier properties against moisture such as water vapour, and still facilitates a high deaeration rate during filling.

As a first aspect of the invention, there is provided a material suitable for a ply of a sack, comprising a porous sheet provided with a coating on at least one of its surfaces, wherein the coating comprises at least one polyolefin.

As a second aspect of the invention, there is provided a sack comprising a ply, which comprises a material according to any embodiment or example of the first aspect.

As a third aspect of the invention, there is provided a method of forming a coating on a porous sheet, comprising the steps of:

a) providing a porous sheet and a dispersion comprising at least one polyolefin;
b) applying the dispersion on at least one surface of the sheet; and
c) optionally, heating the sheet to a temperature above the melting temperature of the at least one polyolefin.

As a fourth aspect of the present invention, there is provided a method for manufacturing a single ply sack, comprising the steps:

a) providing a sheet that comprises a material according to any embodiment or example of the first aspect.
b) tubing and cutting the sheet to form a tubular piece with two open ends, wherein the sheet is oriented such that the coating is facing the interior of the tubular piece; and
c) closing at least one end of the tubular piece to form the sack.

As a fifth aspect of the invention, there is provided a method for manufacturing a two-ply sack comprising the steps:

a) providing a first and a second sheet, wherein at least one of the first and the second sheet comprises a material according to any embodiment or example of the first aspect;
b) arranging the first and second sheet so that the coating on the first sheet is facing the second sheet and/or the coating on the second sheet is facing the first sheet;
c) tubing and cutting the arranged sheets from step b) to form a tubular piece with two open ends, wherein the first sheet is forming an outer ply and the second sheet is forming an inner ply of the tubular piece; and
d) closing at least one end of the tubular piece to form the two-ply sack.

As a sixth aspect of the present invention, there is provided the use of at least one polyolefin as a water vapour barrier coating on a porous sheet suitable for a ply of a sack.

DETAILED DESCRIPTION OF THE INVENTION

As a first aspect of the invention, there is provided a material suitable for a ply of a sack, comprising a porous sheet provided with a coating on at least one of its surfaces, wherein the coating comprises at least one polyolefin.

A porous sheet refers to a sheet having pores through which air may pass.

In the context of the present disclosure, a coating refers to a layer or coverage that is spread out over a surface. The coating may be adhered to the surface.

A polyolefin refers to any organic substance prepared by polymerization of any type of alkenes. The polyolefin may be thermoplastic.

The first aspect of the invention is based on the surprising finding and insight that a porous material provided with a coating comprising at least one polyolefin has an unusual combination of properties, which are a combination of a water vapour barrier with high air permeability. Thus, a material according to the first aspect of the invention is suitable for forming a ply in a sack.

In an embodiment of the first aspect, the porous sheet is a paper sheet.

A paper refers to a material manufactured in sheets from the pulp of wood or other fibrous substances, which material may comprise additives such as synthetic fibers or biodegradable fibers.

A paper sheet may have high porosity and may easily be covered with a coating comprising polyolefin. Further, paper is normally a relatively cheap material. Consequently, a paper is a suitable substrate for a coating.

As a further example, a paperboard is not a sheet which is suitable for a ply of a sack.

As an example, the paper may be a Kraft paper sheet.

A Kraft paper sheet refers to a paper sheet produced from wood pulp by the Kraft process. The Kraft process removes almost all lignin from the wood, which results in almost pure cellulose fibers. The Kraft process is known to a person skilled in the art. The Kraft paper sheet may be a sack Kraft paper.

A Kraft paper sheet is characterized by overall good strength properties and high porosity, and is thus suitable for a variety of applications.

As another example, the extensibility level of the paper may be selected from the group consisting of natural (N), semi-extensible (SE) or fully extensible (E) paper.

The term extensibility is used herein to describe papers which have been given enhanced machine direction stretch properties, either in the paper making process or by subsequent operation. In the context of the present disclosure, natural paper (N) has a stretch level of 2-4%, such as 3%, semi-extensible (SE) paper has a stretch level of 4-6%, such as 5%, and fully extensible (E) paper has a stretch level of above 6%, such as 7.5%.

A paper with N, SE or E stretch levels are usually tougher than other papers, and are thus suitable for certain applications were a tough paper is required.

Further, as another example, the grammage of the paper is 50-130 g/m$^2$ m, such as 70-110 g/m$^2$.

The grammage refers to the paper density in terms of mass per unit of area. A paper having a grammage within the specified range may be suitable for e.g. a ply of a sack.

As another example, the paper may be creped or micro-creped, such as a creped or micro-creped paper having a machine direction (MD) stretch of 2-10%, such as 6-8%.

In the context of the present disclosure, a creped paper refers to a paper that has been subjected to a wet creping process giving the paper a greater machine direction stretch. Further, a micro-creped paper refers to a paper that has been subjected to a creping process which leads to a paper that is mechanically crimped, or compacted, with a barely visible creping in the machine direction. A micro-creped paper may be produced by the Clupak process, which is known in the art. A creped or micro-creped paper may for example be a paper having alternate ridges or grooves, which may or may not be parallel.

A creped or micro-creped paper is more flexible than a paper that has not been subjected to any creping process. Thus, creped or micro-creped papers are suitable in a variety of applications, in which high flexibility is required. As an example, a paper with N, SE or E stretch levels may be creped or micro-creped, to further increase the extensibility.

In an embodiment of the first aspect of the invention, the paper is an extensible (E) paper with a machine direction (MD) stretch of 7-9%, such as about 8% and a grammage of 100-120 g/m$^2$, such as about 110 g/m$^2$. Such a paper may suitably be coated according to the invention As an example, the water vapour transmission rate (WVTR) through the paper, measured with TAPPI 448, may be below 750 g/m$^2$ and day, such as below 720 g/m$^2$ and day, such as below 710 g/m$^2$ and day, such as below 700 g/m$^2$ and day. Such papers may be suitable to use in a sack.

As a further example, the air permeability measured as Gurley flow according to ISO 5636/5 through the paper may be below 10 s, such as below 8 s, such as about 5 s. Such papers may also be suitable to use in a sack.

In embodiments of the first aspect of the invention, the water vapour transmission rate (WVTR) through the material, measured with TAPPI 448, is below m 670 g/m$^2$ and day, such as below 400 g/m$^2$ and day, such as below 200 g/m$^2$ and day, such as below 160 g/m$^2$ and day. In context of the present disclosure, the water vapour transmission (WVTR) rate refers to the rate at which water migrate through a material. The WVTR may be measured using the TAPPI 448 method, which is well known to the person skilled in the art, and may be quoted as grams per m$^2$ per day (24 hours).

If the material has a WVTR below the mentioned values, it serves as a water vapour barrier, thus decreasing the rate at which moisture can penetrate through the material.

In another embodiment of the first aspect of the invention, the barrier improvement factor of the material, which is the ratio obtained from the WVTR of the material provided with no coating divided by the WVTR provided with the coating, is at least 1.05, such as at least 2, such as at least 3, such as at least 4, such as at least 5.

In embodiments of the first aspect of the invention, the air permeability measured as Gurley flow according to ISO 5636/5 through the material is below 20 s, such as below 15 s, such as below 12 s.

The Gurley flow is a well-known method for measuring the air permeance of paper and board. The Gurley flow may thus be measured using the International Organization for Standardization standard ISO 5636/5. A material having a Gurley flow below 20 s, such as below 15 s, such as below 12 s, has high air permeability, thus facilitating rapid transport of air through the material, e.g. during filling of a sack comprising the material.

In an embodiment of the first aspect of the invention, the average coverage of the coating is 1-20 g/m$^2$ on the at least one surface.

The average coverage of the coating refers to the average coverage on the part of the surface that has been subjected to coating. As an example, if half of a surface of the sheet has been subjected to coating, the average coverage refers to the average surface coverage on half of that surface, and if a whole surface has been subjected to coating, the average surface coverage refers to the average surface coverage on the whole surface etc. The coverage may thus vary on the part of the surface that is coated, and may be calculated based on the amount of polyolefin that is added to the surface during coating. Further, the coverage may be calculated based on the weight difference of the material before and after coating.

An average coverage of the coating of 1-20 g/m$^2$ is a comparably thin coating, and is thus advantageous in that low amounts of polyolefins are needed in order to provide such a coating, which means comparably low costs. The comparably thin polyolefin coatings within 1-20 g/m$^2$ still provides a barrier that has a reduced WVTR as well as a high air permeability, as seen in Examples 1 and 2 of the present disclosure.

As an example, the average coverage of the coating may be 3-14 g/m$^2$, such as 5-12 g/m$^2$, such as 6-10 g/m$^2$, such as 6-8 g/m$^2$ on the at least one surface.

In embodiments of the first aspect of the invention, at least one polyolefin has a melting point of 50-95° C., such as about 60-85° C.

The melting point of the polyolefin refers to the transition of the polyolefin from a crystalline or semi-crystalline phase to a solid amorphous state, i.e. the crystalline melting temperature. The melting point, $T_m$, of a polyolefin is a property well known to the skilled person.

A polyolefin having a melting point as low as 50-95° C., such as about 60-85' C., may be advantageous to use during coating of the surface, since only a small temperature increase is needed to melt the polyolefin, i.e. a low temperature is needed in order to facilitate coalescence of crystalline or semi-crystalline polyolefin to a coating.

In an embodiment of the first aspect, the at least one polyolefin comprises at least two polyolefins. Mixtures of at least two polyolefins may give rise to a coating having beneficial permeability properties.

In another embodiment of the first aspect, at least one polyolefin is a copolymer.

A copolymer refers to a polymer derived from more than one monomer. As an example, the copolymer may be selected from an ethylene copolymer, a propylene copolymer, or any combination thereof. An ethylene copolymer refers to a copolymer derived from more than one monomer, in which at least one is ethylene (also known as ethene), and a propylene copolymer refers to a copolymer derived from more than one monomer, in which at least one is propylene (also known as propene). As a further example, the copolymer may be an ethylene-propylene copolymer, i.e. a copolymer derived from more than one monomer, in which at least one is ethylene and at least one is propylene. As an example, the copolymer may be derived from ethylene and propylene monomers only. Such a polyolefin copolymer has shown to give rise to a coating having satisfactory water vapour and air permeability properties, as shown in the Examples of the present disclosure.

As a further example, the at least one polyolefin may comprise 1-propene, polymer with ethene, having CAS number 9010-79-1.

In a further example, at least one polyolefin may be a functional polymer, such as a polymer having a chemical group introduced into the polymer molecule or a polymer in which a chemical group has been converted into another group, so that the chemical or physical properties have been altered. Functional polymers may lead to a coating that has good adhesion properties to specific surfaces, such as polar surfaces.

In embodiments of the first aspect of the invention, the coating is comprising at least one polyolefin, provided that the at least one polyolefin is not polyethylene (PE) alone. It may be advantageous to use coating that does not only comprise polyethylene as the polyolefin, since films or coatings consisting only of polyethylene may not have a desired resistance to oil and grease in several applications. Further, a single polyethylene coating may also be associated with a number of problems, e.g. single polyethylene coatings having a surface coverage below 20 g/m$^2$ is generally not a good water vapour barrier and single polyethylene coatings having a surface coverage above 34 g/m$^2$ may cause the underlying surface to curl.

As a second aspect of the present invention, there is provided a sack comprising a ply, which comprises a material according to any embodiment or example of the first aspect above.

The terms and definitions used in the second aspect of the invention are as defined in connection with the first aspect of the invention above.

The second aspect of the invention is based on the insight that the material according to the first aspect is suitable for use as a ply of a sack. Consequently, a sack comprising such a material may have a low water vapour transmission rate, thus preventing water from penetrating the ply to the interior of the sack, and still have high air permeability, thus facilitating filling of the sack at high speed.

In an embodiment of the second aspect, the sack consists of a single ply comprising a material according to any embodiment or example of the first aspect above. As an example, the single ply may be oriented such that the coating is facing the interior of the sack.

A single sack having a coating as described above facing the interior may be advantageous, since conventional single ply sacks having a free film facing the interior has several problems. An example of such a problem is that the free film normally has to be glued to the sack paper of the single ply sack. The introduction of gluing obviously increases the complexibility of the sack forming process. Further, the gluing of a free film may cause the free film to fold in overlap regions of the sack wall and expose openings between the free film and the ply, which in turn may cause products that are filled into the sack to end up between the paper and the free film during filling. Therefore, parts of the product may not be protected against water vapour. Further, having the coating facing the interior of the sack may prevent the coating from being ruptured or damaged during storing and handling of the sack, and a coating facing the interior does not affect the friction properties of the exterior surface of the sack, which are important during piling of sacks, or the printablity of the exterior surface of the sack.

In another embodiment of the second aspect of the invention, the sack is comprising an inner ply and an outer ply, of which at least one comprises a material according to any embodiment or example of the first aspect above.

An outer ply of a sack refers to the ply of a sack having a surface that faces the exterior and the inner ply of a sack refers to the ply of a sack having a surface that faces the interior of the sack.

As an example, the inner ply may comprise a material according to any embodiment or example of the first aspect above and the inner ply may be oriented such that the coating is facing the outer ply.

As a further example, the outer ply may comprise a material according to any embodiment or example of the first aspect above and the outer ply may be oriented such that the coating is facing the inner ply.

Sacks comprising an inner or outer ply as described above may thus be able to hold large weights due to both an inner and an outer ply, and still have properties of good resistance to water vapour transmission and high deaeration rate. Consequently, such sacks does not have to include a free film between the inner and outer ply in order to have water vapour barrier properties, and therefore does not have to comprise slits in any ply of the sack construction. Slits severely decreases the barrier properties of a ply, which may lead to water vapour penetration. Multi-ply sacks of the present disclosure may thus be provided without a free film.

In other embodiments of the second aspect, the sack comprises more than two plies, such as three plies, four plies etc.

In further embodiments of the second aspect, the water vapour transmission rate (WVTR) through the sack wall constituted by the ply or plies, measured with TAPPI 448, is below 200 g/m$^2$ and day, such as below 170 g/m$^2$ and day, such as below 150 g/m$^2$ and day. A sack having a WVTR below the above mentioned values has thus satisfactory water barrier properties, and may therefore suitably serve as a container for material that is sensitive to moisture. It is to be understood that the WVTR in relation to sacks having more than one ply refers to the transmission rate of water vapour measured from the exterior of the sack, through all plies and into the interior of the sack at a part of a sack wall that has no overlapping sections.

In another embodiment of the first aspect of the invention, the barrier improvement factor of the sack, which is the ratio obtained from the WVTR of a sack having no ply comprising a material according to any embodiment of the first aspect of the invention divided by the WVTR of the same type of sack having at least one ply comprising a material according to any embodiment of the first aspect of the invention, is at least 1.5, such as at least 2, such as at least 3, such as at least 3.5, such as at least 4.

In another embodiment of the second aspect the air permeability measured as Gurley flow according to IS05636/5 through both the inner and outer ply is below 30 s, such as below 25 s, such as below 20 s.

A sack having a Gurley flow below 30 s, such as below 25 s, such as below 20 s, provides for a high deaeration rate and thus facilitates filling of the sack at a high rate. In embodiments of the second aspect, the sack is suitable for holding a powdery or granularly material, such as cement. The powdery or granularly material may for example be cement, building materials, powdered goods for the construction industry, ready-mix building materials, chemicals or garden fertilizers.

As a related aspect, there is provided a method for filling a sack with a powdery or granularly material, comprising the steps of a) providing a sack according to any embodiment or example of the second aspect of the invention and a powdery or granularly material; and
b) filling the sack with the powdery or granularly material, such that an overpressure is present inside the sack and wherein air is transported through a wall of a sack during the filling.

As a third aspect of the invention, there is provided a method of forming a coating on a porous sheet, comprising the steps of;

a) providing a porous sheet and a dispersion comprising at least one polyolefin,
b) applying the dispersion on at least one surface of the sheet; and
c) optionally, heating the sheet to a temperature above the melting temperature of the at least one polyolefin.

The terms and definitions used in the third aspect of the invention are as defined in connection with the other aspects of the invention above.

The dispersion may for example be a suspension, a colloid, or a solution. The at least one polyolefin may be present in the form of particles in the dispersion. The dispersion may also be an emulsion dispersion, in which particles of the at least one polyolefin are suspended with the help of emulsifiers.

Applying the dispersion on at least one surface refers to distributing the dispersion on the surface in an amount that promotes the formation of a coating on the surface. The application of the dispersion may be performed e.g. by roll coating, gravure or spray-coating. These techniques, as well as other techniques for applying a dispersion on a surface, are well-known to the skilled person.

Heating the sheet to a temperature above the melting temperature of the at least one polyolefin refers to subjecting the sheet to heat such that the at least one polyolefin starts to melt. The heating of step c) may be performed by means of drying the sheet after applying the dispersion to the sheet using heated air. If the dispersion comprises particles of the at least one polyolefin, the particles may deform and coalesce into a substantially void-free film above the melting temperature of the at least one polyolefin. Further, the heating of step c) may be performed during a manufacture of a sack using the material obtained from step b). Also, the heating of step c) may be performed/achieved during filling of a sack comprising the material obtained from step b), wherein the filling material added to the sack has a high temperature, such as a temperature between 30-100° C., such as about 70-90° C. An example of such a filling material is cement in a powdery form, which may be filled at a temperature of about 70-90' C. Consequently, the heating of step c) may be achieved during or just after the sack has been filled with a filling material, so that a substantially void-free film is formed in a ply of the sack just after filling. The third aspect of the invention provides a convenient method for coating a sheet with at least one polyolefin, since the polyolefin is provided in the form of a dispersion. Thus, the method does not require any complicated processes as extrusion, thermoforming, injection molding or blow molding for applying the at least one polyolefin on a surface.

In embodiments of the third aspect, the sheet is a paper sheet as described in any embodiment in relation to the first aspect above.

Since the at least one polyolefin is applied in the form of a dispersion, no preheating is required. In another embodiment of the third aspect, the dispersion may thus be applied at a temperature below the melting point of the at least one polyolefin.

In other embodiments, the dispersion is heated to a temperature above the melting temperature of the at least one polyolefin before applying it to the sheet in step b).

In embodiments of the third aspect, the dispersion has a solids content of 35-60%, such as 40-55%.

A solids content refers to the weight percentage of solids, such as the particles of the at least one polyolefin. Further, the dispersion may be stable at a solids content of 35-60%, such as 40-55%.

If the solids content of the dispersion is as high as within the specified ranges, or if the dispersion is stable at a solids content as high as within the specified ranges, a relatively low dispersion volume may be used during the coating process.

Further, in embodiments of the third aspect, the dispersion is an aqueous dispersion. An aqueous dispersion is advantageous in that no or little solvents are needed to keep the at least one polyolefin dispersed in the dispersion.

In another embodiment, the at least one polyolefin is a copolymer. As an example, the least one copolymer may be an ethylene-propylene copolymer.

Copolymers, such as an ethylene-propylene copolymer, have shown to give excellent coatings on paper sheets, as seen in the Examples of the present disclosure.

Further, the dispersion may comprise additives such as plasticizers, fillers, tackifiers, pigments, stabilizers and other common thermoplastic compound ingredients.

As a fourth aspect of the present invention, there is provided a method for providing a single ply sack comprising the steps:

a) providing a sheet that comprises a material according to any example or embodiment of the first aspect of the invention,
b) tubing and cutting the sheet to form a tubular piece with two open ends, wherein the sheet is oriented such that the coating is facing the interior of the tubular piece; and
c) closing at least one end of the tubular piece to form the sack.

The method for manufacturing a sack according to the fourth aspect of the invention is fast, requires only a few process steps, and is easy to implement industrially. As an example, step c) may involve closing both ends of the sack.

As another example, step c) may involve closing only one end so as to form an open-mouth sack.

In an embodiment of the fourth aspect above, the closing of step c) is performed by means of folding.

Folding may be performed manually or by machinery. As an example, the folding may further involve the step of attaching an extra strip of paper on at least part of the folded area so as to increase the stability of the folded area. As another example, folding may involve folding and gluing the open end around a vent material, which may be a ply of higher basis weight compared to the inner ply or the an outer ply, so that an enforced vent may be formed that is adapted to fit a filling spout of a filling machine.

As a fifth aspect of the present invention, there is provided a method for manufacturing a two-ply sack comprising the steps:

a) providing a first and a second sheet, wherein at least one of the first and the second sheet comprises a material according to any example or embodiment of the first aspect of the invention;
b) arranging the first and second sheet so that the coating on the first sheet is facing the second sheet and/or the coating on the second sheet is facing the first sheet;
c) tubing and cutting the arranged sheets from step b) to form a tubular piece with two open ends, wherein the first sheet is forming an outer ply and the second sheet is forming an inner ply of the tubular piece; and
d) closing at least one end of the tubular piece to form the two-ply sack.

The method for manufacturing a two-ply sack according to the fifth aspect of the invention is fast, requires only a few process steps, and is easy to implement industrially. As an example, step d) may involve closing both ends of the sack. As another example, step d) may involve closing only one end so as to form an open-mouth sack.

In an embodiment of the fifth aspect above the closing of step d) is performed by means of folding.

Folding may be performed as described in relation to the fourth aspect above.

In a related aspect of the present invention, there is provided a method for manufacturing a three-ply sack, comprising the steps:

a) providing a first, a second and a third sheet, wherein at least one of the first, second and third sheet comprises a material according to any embodiment or example of the first aspect;
b) arranging the first, second and third sheets so that the coating on the first sheet is facing the second sheet and/or the coating on the second sheet is facing any of the first or third sheet, and/or the coating of the third sheet is facing the second sheet;
c) tubing and cutting the arranged sheets from step b) to forma tubular piece with two open ends, wherein the first sheet is forming an outer ply and the third sheet is forming an inner ply of the tubular piece; and
d) closing at least one end of the tubular piece to form the three-ply sack.

In a sixth aspect of the present invention, there is provided the use of at least one polyolefin as a water vapour barrier coating on a porous sheet suitable for a ply of a sack.

The coating, polyolefin and porous sheet may be as in any embodiment of the first aspect above. Consequently, in an embodiment of the sixth aspect, the at least one polyolefin is a copolymer, and the copolymer may be an ethylene-propylene copolymer.

The use of at least one polyolefin as a water vapour barrier coating on a material suitable for a sack is a convenient and efficient way to provide a material that has both a low water vapour transmission rate as well as a high air permeability. Thus, a use of at least one polyolefin as an air permeable water vapour barrier coating on a material suitable for a ply of a sack is also provided.

As a seventh aspect of the present invention, there is provided the use of the sack according to any embodiment of the second aspect of the invention for holding a powdery or granularly material, such as a material selected from cement, building materials, powdered goods for the construction industry, ready-mix building materials, chemicals or garden fertilizers, food, animal feed or pet food.

EXAMPLES

Figure 1:
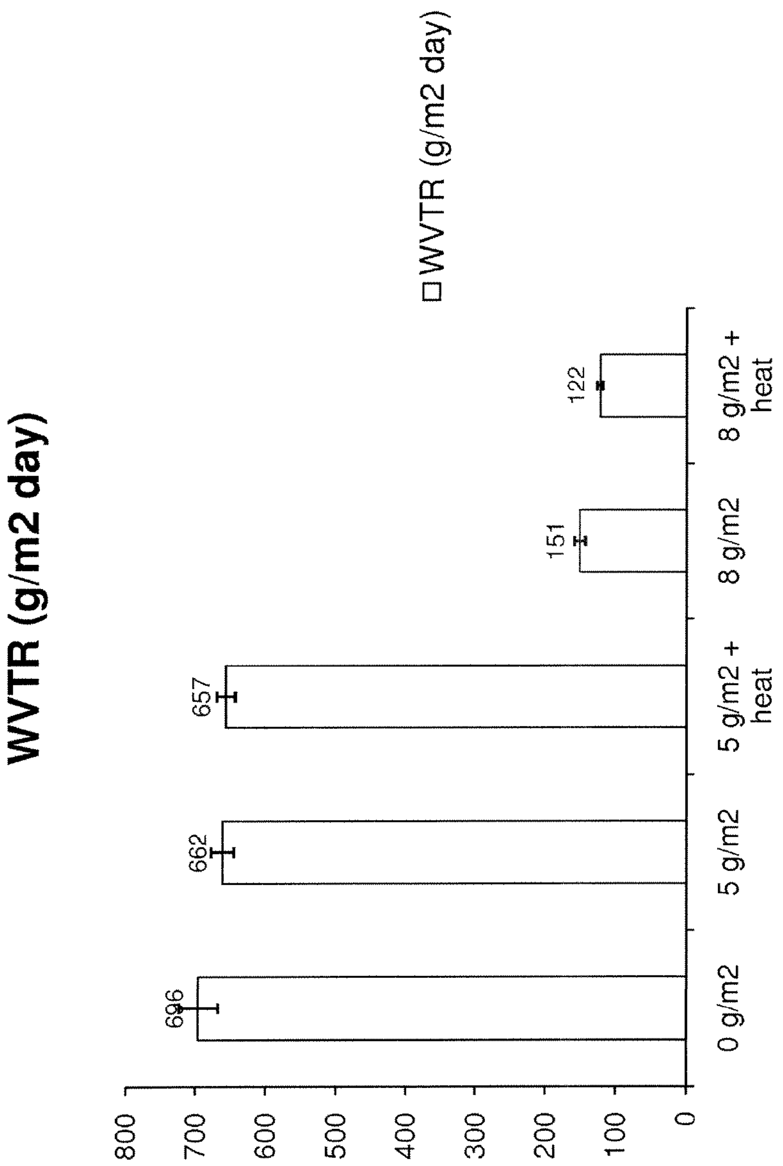
FIG. 1 shows the average water vapour transmission rate (WVTR) measured using TAPPI 448 for uncoated papers (0 g/m$^2$) and papers coated with 5 g/m$^2$ and 8 g/m$^2$, respectively, of a polyolefin coating. The average WVTR of papers coated with 5 g/m$^2$ and 8 g/m$^2$, which had further been subjected to heat treatment is plotted in the same figure. The WVTR is plotted as the average water vapour amount (g) per m$^2$ per day (24 hours) of three different papers. The error bars represent the standard deviation.

The following non-limiting examples will further illustrate the present invention.

Example 1

Water Vapour Transmission Rate of Coated Papers

Materials and Methods

Unbleached brown sack paper (Quickfill XRUN, Billerud AB, a natural (N) paper with a machine direction stretch of about 2.7% and a grammage of 70 $g/m^2$) was coated with a polyolefin dispersion (DPOD 8501, Dow Chemicals). The polyolefin dispersion comprised about 40% water and about 40% 1-Propene, polymer with ethane (CAS #9010-79-1). The coating was applied using a laboratory rod coater (RK Print-Coat Instruments Ltd., K Control Coater 202) and the bars no. 2 (wire diameter 0.15 mm, wet film 12 μm), no. 3 (wire diameter 0.31 mm, wet film 24 and no. 4 (wire diameter 0.51 mm, wet film 40 μm) were used with a coating speed of 4-6 m/min. Some samples were heated to a temperature above 60° C. after coating.

The water vapour transmission rate (WVTR) of samples were measured during 8 hours using TAPPI 448, which is a standard method used to measure water vapour transmission rates for specimens at 23° C. and 50% RE. Coated papers were attached to cups with a well-defined area and filled with desiccant ($CaCl_2$). The cups were weighed at repeated time intervals and the weight plotted as a function of time. When the constant gain rate period was reached, the water transmission rate (WVTR) was calculated using the following relation:

$$WVTR = \frac{\frac{y}{x} \times k}{A}$$

where, y/x is the slope from the plotted weight of cup versus the time, k is a constant and A is the sample area.

Results

The WVTR of coated papers are shown in FIG. 1. Two levels of surface coverage were tested; 5 $g/m^2$ m and 8 $g/m^2$, respectively. As a comparison, uncoated paper was also tested (0 $g/m^2$). Further, coated papers subjected to heat treatment were also tested (5 $g/m^2$+heat and 8 $g/m^2$+heat). The average of three samples is shown in FIG. 1. The measurements clearly showed that the WVTR dropped when the papers were coated with the polyolefin dispersion, from an average of 696 $g/m^2$ per day for the uncoated paper to 662 $g/m^2$ per day with a surface coverage of 5 $g/m^2$ and down to 151 $g/m^2$ per day for the coating of 8 $g/m^2$. Further, the heat treatment seemed to give a significant reduction, about 19%, on the WVTR for the high coating level of 8 $g/m^2$. Thus, these results show that a paper with a polyolefin coating had excellent barrier properties against water vapour.

Figure 2:
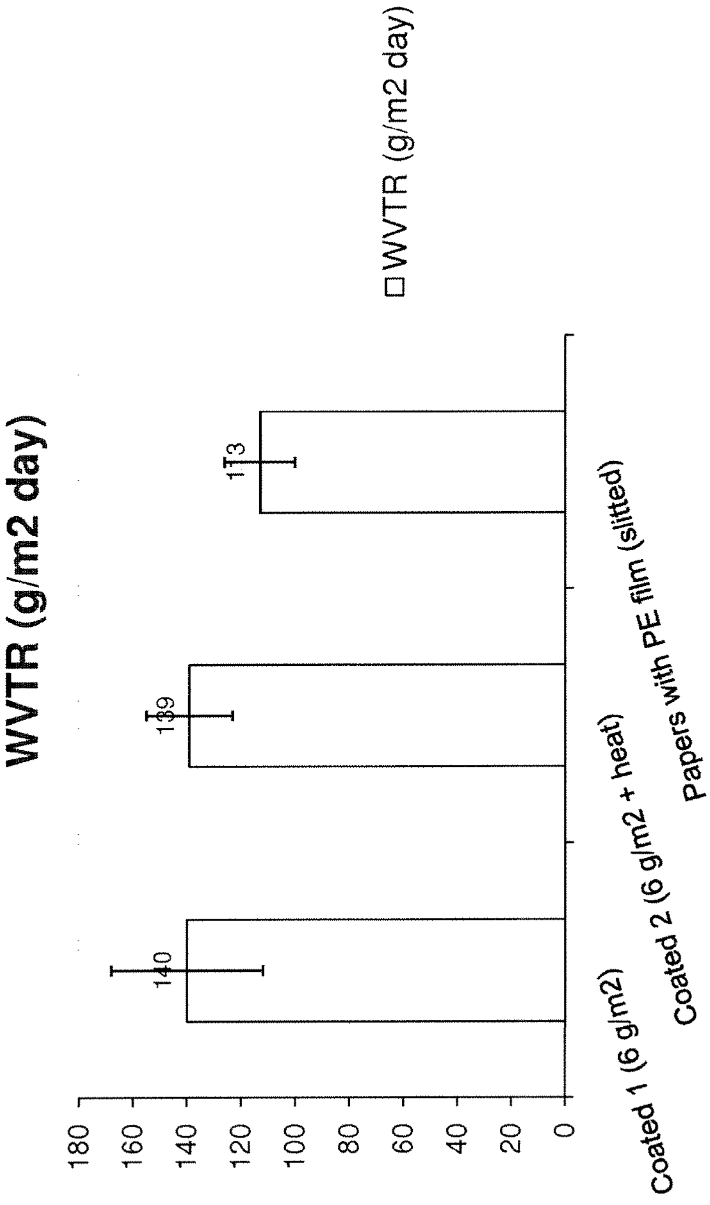
FIG. 2 shows the average water vapour transmission rate (WVTR) measured using TAPPI 448 for different combinations of papers: a combination with an uncoated paper and a paper coated with 6 g/m of a polyolefin coating (=Coated 1 (6 g/m$^2$)), a combination with an uncoated paper and a paper coated with 6 g/m$^2$ of a polyolefin coating, wherein the coated paper had been subjected to heat treatment (=Coated 2 (6 g/m$^2$+heat)) and a combination of two papers with an intermediate polyethylene (PE) film (=Papers with PE-film (slitted)). The WVTR is plotted as the average water vapour amount (g) per m$^2$ per day (24 hours) of three different papers. The error bars represent the standard deviation.

Further, the WVTR for combinations of papers were also tested so as to represent a two-ply sack wall. The results are displayed in FIG. 2. The following combinations were tested: an untreated paper in combination with a paper coated with 6 $g/m^2$ of the polyolefin dispersion, an untreated paper in combination with a paper coated with 6 $g/m^2$ of the polyolefin dispersion, which had also been subjected to heat treatment, and a combination with two papers with an intermediate polyethylene (PE) film. The PE film had slits according to standard procedures in the art, and the two papers with the PE film in between thus represented a standard sack wall construction within the art. It was seen from the results that the two combinations with coated papers led to similar low WVTR, 140 and 139 $g/m^2$ day, respectively, as when using an intermediate PE-film that led to a WVTR of 113 $g/m^2$ day. Consequently, the combinations having a paper with a polyolefin coating had as low WVTR as two papers with a plastic PE-film in between, and thus forms a suitable water vapour barrier.

Example 2

Air Permeability of Paper Materials

Materials and Methods

The air permeability of a combination of papers was measured with the Gurley method, which is a standard procedure that measures the time for a defined volume of air to pass through a defined area of the test substrate at a constant pressure. The Gurley method is specified in IS05636/5. In these examples an internally developed measurement system named the BigGurley equipment was used. The measurement area was 400 $cm^2$ (200×200 mm). The working principle was the same as in a larger MegaGurley equipment supplied by Haver & Boecker (Germany), i.e. the flow of air through the defined area (400 $cm^2$) was measured as the time a specific volume at a given pressure difference passes through the sample.

Results

Figure 3:
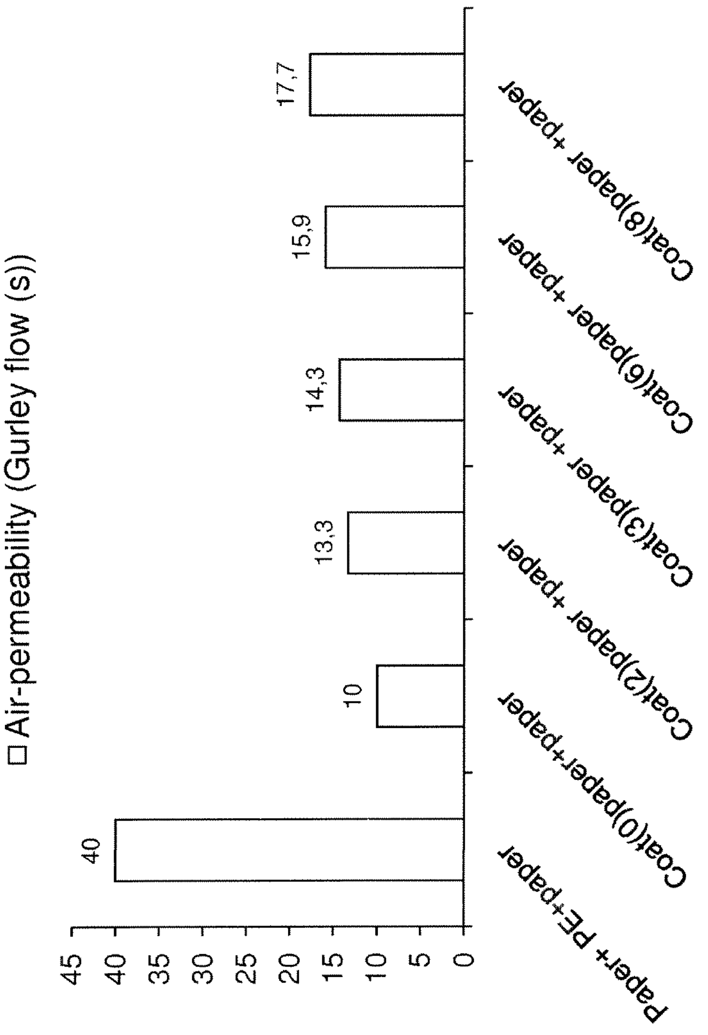
FIG. 3 shows the air permeability in terms of Gurley flow (s) measured for different combinations of papers: two papers with an intermediate, standard slit polyethylene (PE) film (paper+PE+paper), two uncoated papers (Coat(0)paper+paper), a paper with a 2 g/m$^2$ polyolefin coating in combination with an uncoated paper (Coat(2)paper+paper), a paper with a 3 g/m$^2$ polyolefin coating in combination with an uncoated paper (Coat(3)paper+paper), a paper with a 6 g/m$^2$ polyolefin coating in combination with an uncoated paper (Coat(6)paper+paper) and a paper with a 8 g/m$^2$ polyolefin coating in combination with an uncoated paper (Coat(8)paper+paper).
Figure 4:
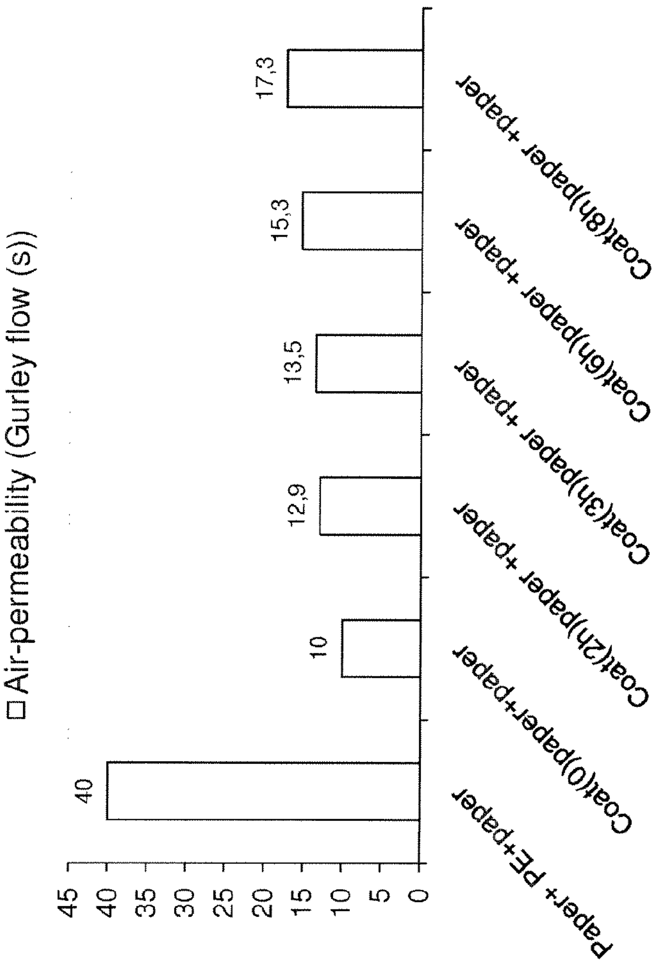
FIG. 4 shows the air permeability in terms of Gurley flow (s) measured for different combinations of papers: two papers with an intermediate, standard slit polyethylene (PE) film (paper+PE+paper), two uncoated papers (Coat(0)paper+paper), a paper with a 2 g/m$^2$ polyolefin coating subjected to heat treatment in combination with an uncoated paper (Coat(2h)paper+paper), a paper with a 3 g/m$^2$ polyolefin coating subjected to heat treatment in combination with an uncoated paper (Coat(3h)paper+paper), a paper with a 6 g/m$^2$ polyolefin (in coating subjected to heat treatment in combination with an uncoated paper (Coat(6h)paper+paper) and a paper with a 8 g/m$^2$ polyolefin coating subjected to heat treatment in combination with an uncoated paper (Coat (8h)paper+paper).

The air permeability was tested for different combination, or layers, of papers in order to mimic the air permeability through sack wall materials. The papers used were Quickfill XRUN, Billerud AB. The following paper combinations/layered structures were tested: two papers with an intermediate, standard slit polyethylene (PE) film (paper+PE+paper), two uncoated papers (Coat(0)paper+paper), a paper with a 2 $g/m^2$ polyolefin coating in combination with an uncoated paper (Coat(2)paper+paper), a paper with a 3 $g/m^2$ polyolefin coating in combination with an uncoated paper (Coat(3)paper+paper), a paper with a 6 $g/m^2$ polyolefin coating in combination with an uncoated paper (Coat(6)paper+paper) and a paper with a 8 $g/m^2$ polyolefin coating in combination with an uncoated paper (Coat(8)paper+paper). The results are displayed in FIG. 3. Moreover, the same combinations, but in which the coatings were subjected to heat treatment, were also tested and are displayed in FIG. 4. It could be seen that the combinations in which a coated paper was used had a significantly higher air permeability compared to the combination with the PE film in between. The Gurley flow was between 13 and 18 s for the combinations with coatings or heat treated coatings, compared to 40 s for the combination with the PE film. Further, the air permeability for the combinations having a polyolefin coating was almost as high as the combination with two uncoated papers. Consequently, a combination having a polyolefin coating, which had excellent barrier properties as seen in Example 1, also surprisingly had high air permeability. Thus, these examples clearly demonstrate that a sack wall having a coating comprising a polyolefin has both excellent water vapour barrier properties and facilitates high speed during filling of the sack.

The invention claimed is:

1. A method of forming a coated porous sheet, comprising the steps of:

a) providing a porous sheet, wherein said porous sheet comprises an extensible (E) paper with a machine direction (MD) stretch in the range of from 7 to 9% and a grammage in range of from 100 to 120 $g/m^2$; and b) providing a coating composition consisting essentially of an aqueous dispersion consisting essentially of at least one polyolefin, water, one or more stabilizers, optionally one or more plasticizers, optionally one or more fillers, optionally one or more tackifiers, and optionally one or more pigments;

c) applying said aqueous dispersion on at least one surface of said sheet;

d) optionally, heating said sheet to a temperature above the melting temperature of said at least one polyolefin; and e) thereby forming said coated porous sheet, wherein said coated porous sheet has a water vapour transmission rate (WVTR), measured according to TAPPI 448, in the range of less 670 $g/m^2$ and day and an air permeability measured as Gurley flow according to ISO 5636/5 in the range of less than 20 s.

2. A method for manufacturing a single ply sack, comprising the steps:

a) providing a sheet that comprises the coated porous sheet according to claim 1;

b) tubing and cutting said coated porous sheet to form a tubular piece with two open ends, wherein said coated porous sheet is oriented such that said coating is facing the interior of said tubular piece; and c) closing at least one end of said tubular piece by folding to form said sack.

3. A method for manufacturing a two-ply sack comprising the steps:

a) providing a first and a second sheet, wherein at least one of said first and said second sheet comprises the coated porous sheet according to claim 1;

b) arranging said first and second sheet so that said coating on said first sheet is facing said second sheet and/or said coating on said second sheet is facing said first sheet;

c) tubing and cutting said arranged sheets from step b) to form a tubular piece with two open ends, wherein said first sheet is forming an outer ply and said second sheet is forming an inner ply of said tubular piece; and d) closing at least one end of said tubular piece by folding to form said two-ply sack.

* * * * *